US009785448B2

(12) United States Patent
Lin et al.

(10) Patent No.: US 9,785,448 B2
(45) Date of Patent: Oct. 10, 2017

(54) SYSTEM SUSPENDING METHOD, SYSTEM RESUMING METHOD AND COMPUTER SYSTEM USING THE SAME

(71) Applicant: INDUSTRIAL TECHNOLOGY RESEARCH INSTITUTE, Hsinchu (TW)

(72) Inventors: Kuo-Hung Lin, Hsinchu (TW); You-Ching Lin, Hsinchu County (TW); Tzu-Chieh Shen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 24 days.

(21) Appl. No.: 14/983,464

(22) Filed: Dec. 29, 2015

(65) Prior Publication Data

US 2017/0153902 A1    Jun. 1, 2017

(30) Foreign Application Priority Data

Dec. 1, 2015    (TW) .............................. 104140194 A

(51) Int. Cl.
*G06F 9/44* (2006.01)
*G06F 1/32* (2006.01)

(52) U.S. Cl.
CPC .......... *G06F 9/4418* (2013.01); *G06F 1/3287* (2013.01); *G06F 9/4411* (2013.01)

(58) Field of Classification Search
CPC ..... G06F 9/4418; G06F 9/4411; G06F 1/3287
See application file for complete search history.

(56) References Cited

U.S. PATENT DOCUMENTS

| 5,815,731 A | 9/1998 | Doyle et al. |
| 6,157,979 A | 12/2000 | Barnett |
| 7,206,974 B2 | 4/2007 | Kozlov et al. |

(Continued)

FOREIGN PATENT DOCUMENTS

| CN | 101515239 A | 8/2009 |
| CN | 102156532 A | 8/2011 |

(Continued)

OTHER PUBLICATIONS

Inwhee Joe et al., "Bootup Time Improvement for Embedded Linux using Snapshot Images Created on Boot Time", 2011 The 2nd International Conference on Next Generation Information Technology (ICNIT), Jun. 21-23, 2011, pp. 193-196.

(Continued)

*Primary Examiner* — Stefan Stoynov
(74) *Attorney, Agent, or Firm* — Rabin & Berdo, P.C.

(57) ABSTRACT

A system suspending method, a system resuming method and a computer system using the same are provided. The system resuming method of the computer system is applied for resuming the computer system to be a normal status (S0 status) from a suspend-to-ram status (S3 status) or a suspend-to-disk status (S4 status). The computer system includes a plurality of peripheral devices and a central processing unit. The peripheral devices are classified into a first group and a second group. The system resuming method includes the following steps. The central processing unit is powered on. Then, the peripheral devices belonging in the first group are resumed. Next, the computer system is thawed.

20 Claims, 8 Drawing Sheets

(56) References Cited

U.S. PATENT DOCUMENTS

| | | | |
|---|---|---|---|
| 7,293,183 | B2 | 11/2007 | Lee et al. |
| 7,409,537 | B2 | 8/2008 | Tsang |
| 7,480,790 | B2 | 1/2009 | Hobson et al. |
| 7,594,073 | B2 | 9/2009 | Hanebutte et al. |
| 7,725,746 | B2 | 5/2010 | Lee et al. |
| 8,266,354 | B2 * | 9/2012 | Farhan ............ G06F 3/0611 710/10 |
| 8,417,928 | B2 | 4/2013 | Zhao et al. |
| 9,047,201 | B2 * | 6/2015 | Chen ............... G06F 12/0877 |
| 2005/0204181 | A1 * | 9/2005 | Montero ............ G06F 9/4406 714/4.2 |
| 2006/0022398 | A1 | 2/2006 | Forch et al. |
| 2006/0053325 | A1 | 3/2006 | Chary et al. |
| 2010/0077244 | A1 | 3/2010 | Nowak et al. |
| 2013/0219160 | A1 | 8/2013 | Zhao et al. |
| 2013/0290759 | A1 | 10/2013 | Kumar et al. |
| 2013/0304980 | A1 | 11/2013 | Nachimuthu et al. |
| 2014/0115349 | A1 | 4/2014 | Chen et al. |
| 2014/0310552 | A1 | 10/2014 | So et al. |

FOREIGN PATENT DOCUMENTS

| | | |
|---|---|---|
| JP | 2002-132393 A | 5/2002 |
| JP | 2004-164545 A | 6/2004 |
| JP | 2014-157490 A | 8/2014 |
| TW | 514796 B | 12/2002 |
| TW | 588284 B | 5/2004 |
| TW | I309803 B | 5/2009 |
| TW | 201426548 A | 7/2014 |
| TW | 201428626 A | 7/2014 |
| TW | 201508463 A | 3/2015 |
| TW | I486875 B | 6/2015 |
| TW | 201525867 A | 7/2015 |

OTHER PUBLICATIONS

Shi-wu Lo et al., "Swap-before-Hibernate: A Time Efficient Method to Suspend an OS to a Flash drive", SAC '10 Proceedings of the 2010 ACM Symposium on Applied Computing, pp. 201-205.

Kunhoon Baik et al., "Boosting up Embedded Linux device: experience on Linux-based Smartphone", Ottawa Linux Symposium (OLS) Papers for 2010, Jul. 13-16, 2010, pp. 9-18.

Ying-Wen Bai et al., "Design and Implementation of an Instantaneous Turning-on Mechanism for PCs", IEEE Transactions on Consumer Electronics, vol. 53, No. 4, pp. 1595-1601.

Kyung Ho Chung et al., "A Study on the Packaging for Fast Boot-up Time in the Embedded Linux", 13th IEEE International Conference on Embedded and Real-Time Computing Systems and Applications(RTCSA 2007), pp. 1-6.

Gaurav Singh et al., "Optimizing the Boot Time of Android on Embedded System", 2011 IEEE 15th International Symposium on Consumer Electronics, pp. 503-508.

Taiwanese Office Action dated Jul. 1, 2016.

Japanese Office Action dated Oct. 11, 2016 with translation.

* cited by examiner

SYSTEM SUSPENDING METHOD, SYSTEM RESUMING METHOD AND COMPUTER SYSTEM USING THE SAME

This application claims the benefit of Taiwan application Serial No. 104140194, filed Dec. 1, 2015, the disclosure of which is incorporated by reference herein in its entirety.

TECHNICAL FIELD

The disclosure relates in general to a system suspending method, a system resuming method and a computer system using the same.

BACKGROUND

Suspend-to-disk technology (S4) is widely used in fast boot. In the suspend-to-disk technology, the content of the memory is stored into an external storage device and all of the peripheral devices are powered down.

In a system suspending procedure using the suspend-to-disk technology, the content of the memory is recorded in a hibernation file, and the hibernation file is stored in the external storage device.

In a system resuming procedure using the suspend-to-disk technology, all of the peripheral devices are initialized and the hibernation file is loaded for resuming. However, in the system resuming procedure, it spends a lot of time to initialize and resume all of the peripheral devices. Therefore, the speed of the fast boot cannot be increased well.

Wearable devices are popular in life. Power saving is a concern for the wearable devices. A smart wearable device, such as smart glasses, is needed to perform an operating system, like Android operating system. The power consumption of the operating system is large. Therefore, dual-core construction is used in the wearable device. The wearable device performs a complex program by a main-core. When the wearable device does not perform any complex program, the big-core goes into a suspend-to-disk status or a suspend-to-ram status, most of the peripheral devices are powered down, and an auxiliary-core is kept in operation. The key point to achieve this design is that the system resuming procedure of the main-core must be very fast to avoid affecting the user experience. Therefore, it is needed to speed up the system resuming procedure of the big core.

Moreover, along with the development of the non-volatile memory, the DRAM will be replaced by the non-volatile memory in the future. The fast boot using the suspend-to-disk technology will be replaced by the fast boot using the suspend-to-ram technology. The content of the memory will be kept in the non-volatile memory without storing to any external storage device.

In a system suspending procedure using the suspend-to-ram technology, there may be no need to read the hibernation file. However, all of the peripheral devices are still needed to be initialized and resumed. It spends a lot of time to initialize and resume all of the peripheral devices. Therefore, the speed of the fast boot cannot be increased well.

SUMMARY

The disclosure is directed to a system suspending method, a system resuming method and a computer system using the same method.

According to one embodiment, a system suspending method of a computer system is provided. The system suspending method is applied for controlling the computer system to be a suspend-to-ram status (S3 status) or a suspend-to-disk status (S4 status). The computer system includes a plurality of peripheral devices and a central processing unit. The system suspending method includes the following steps. The computer system is frozen. The peripheral devices are suspended. The peripheral devices are classified into a first group and a second group. The peripheral devices, belonging in the first group, are then resumed when the computer system performs a system resuming method and each of the peripheral devices, belonging in the second group, is then resumed according to a demand request. The central processing unit is powered down.

According to another embodiment, a system resuming method of a computer system is provided. The system resuming method of the computer system is applied for controlling the computer system to be a normal status (S0 status) from a suspend-to-ram status (S3 status) or a suspend-to-disk status (S4 status). The computer system includes a plurality of peripheral devices and a central processing unit. The peripheral devices are classified into a first group and a second group. The system resuming method includes the following steps. The central processing unit is powered on. The peripheral devices belonging in the first group are resumed. The computer system is thawed.

According to another embodiment, a computer system includes a plurality of peripheral devices, a central processing unit and a power management interface. The central processing unit is configured to control the peripheral devices. The power management interface is configured to perform a system suspending method which is applied for controlling the computer system to be a suspend-to-ram status (S3 status) or a suspend-to-disk status (S4 status). In the system suspending method, the power management interface freezes the computer system, suspends the peripheral devices, and powers down the central processing unit. The power management interface classifies the peripheral devices into a first group and a second group. The peripheral devices, belonging in the first group, are resumed when the computer system performs a system resuming method and each of the peripheral devices, belonging in the second group, is resumed according to a demand request.

Figure 1:
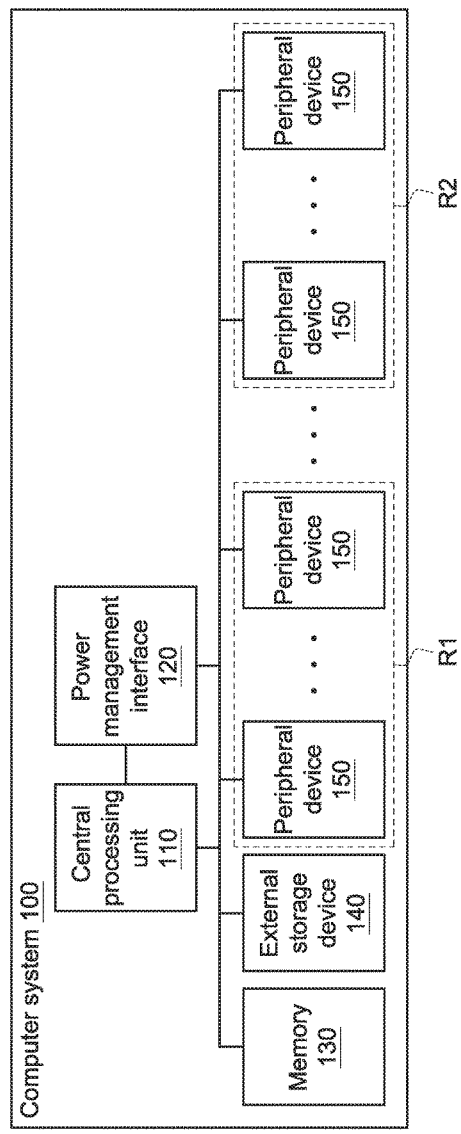
FIG. 1 shows a schematic view of a computer system according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF EMBODIMENTS

According to the embodiments of the present disclosure, "peripheral device resuming on demand" is provided in a system resuming method. In "peripheral device resuming on demand", some peripheral devices which are immediately necessary are resumed. Other peripheral devices are kept at a suspending state, or set to be a fake resumed state which pretends that the peripheral devices are resumed already, and the system resuming method is bypassed. After performing the system resuming method, each of the peripheral devices which is at the suspending state or the fake resumed state is resumed when a demand request provided from an application program is intercepted. As such, the number of the peripheral devices needed to be resumed is reduced to shorten the time spending on the system resuming method.

FIG. 1 shows a computer system 100 according to an embodiment of the disclosure. The computer system 100 includes a central processing unit 110, a power management interface 120, a memory 130, an external storage device 140 and a plurality of peripheral devices 150. For example, the peripheral device 150 may be a display panel, a touch panel, a speaker, a camera, or a universal serial bus (USB). The peripheral devices 150 are classified into a first group R1 and a second group R2. Each of the peripheral devices 150 belonging in the first group R1 is related to at least one foreground program and is needed to be resumed in the system resuming method. Each of the peripheral devices 150 belonging in the second group R2 is not related to any foreground program, and is not needed to be resumed in the system resuming method. For example, the peripheral device 150 belonging in the first group R1 may be the display panel or the touch panel, and the peripheral device 150 belonging in the second group R2 may be the speaker, the camera or the USB.

Figure 2:
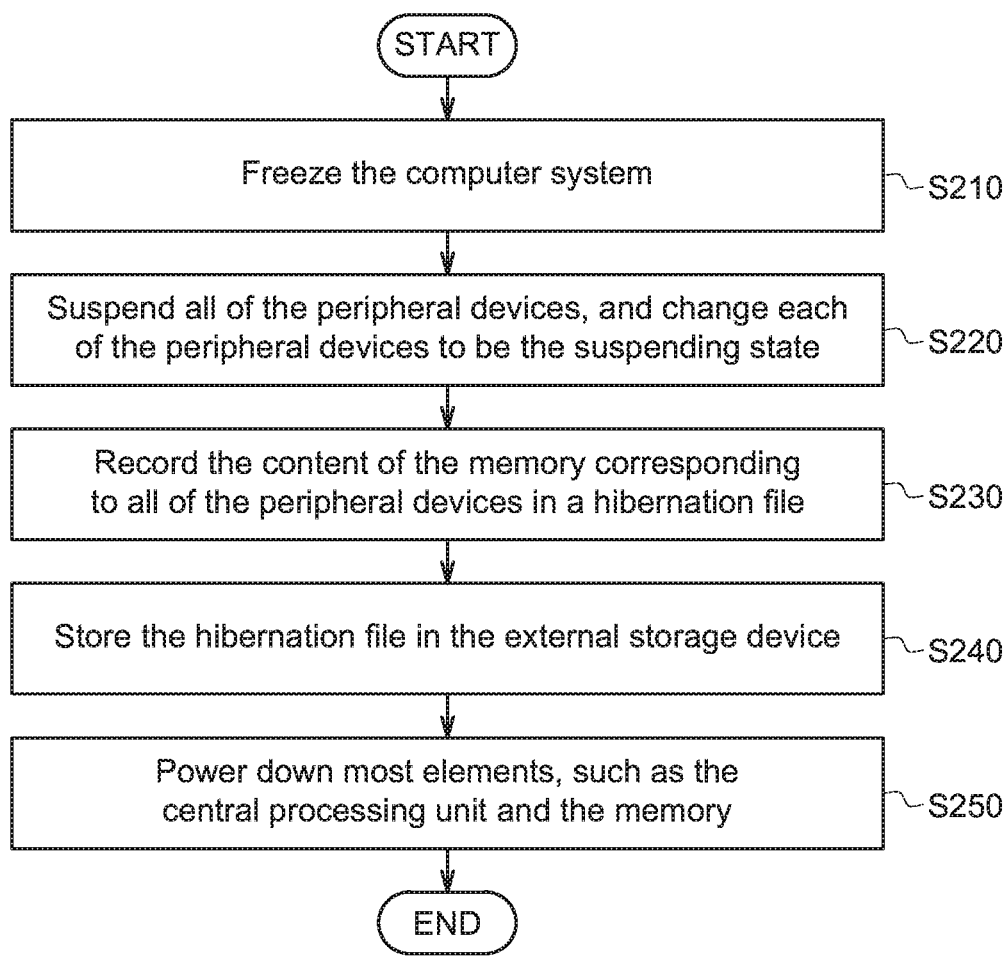
FIG. 2 shows a flowchart of a system suspending method adopting "peripheral device resuming on demand" to control the computer system to be a suspend-to-disk status (S4 status) according to an exemplary embodiment of the disclosure.

Please refer to the embodiments shown in FIGS. 1 and 2. FIG. 2 shows an embodiment of a flowchart of a system suspending method adopting "peripheral device resuming on demand" to control the computer system 100 to be a suspend-to-disk status (S4 status). In step S210, the computer system 100 is frozen.

In step S220, all of the peripheral devices 150 are suspended, and each of the peripheral devices is changed to be the suspending state. The peripheral devices 150 are classified into the first group R1 and the second group R2. In this step, the power management interface 120 may attach a predetermined tag to each of the peripheral devices 150 belonging in the first group R1. Or, the power management interface 120 may record each of the peripheral devices 150 belonging in the first group R1 into a predetermined list.

Whether one peripheral device belongs in the first group R1 or not can be known by checking the predetermined tag or the predetermined list. All of the peripheral devices 150 belonging in the first group R1 are resumed when the computer system 100 performs the system resuming method. Any of the peripheral devices 150 belonging in the second group R2 may be permitted to be resumed when a demand request Q1 is intercepted (shown in FIG. 4). In this step, all of the peripheral devices 150 are at the suspending state (or a powering off state); but all of the peripheral devices 150 are still kept in connection with an operating system and are not unloaded. As such, each of the peripheral devices 150 may be resumed to a former state, which may or may not be an initial state. The former state is a state before performing the system suspending method. The initial state is a state after performing a system boot method.

In step S230, the content of the memory 130 corresponding to all of the peripheral devices 150 is recorded in a hibernation file. In this step, the former state of each of the peripheral devices 150 belonging in the first group R1 and the second group R2 are recorded in the hibernation file.

In step S240, the hibernation file is stored in the external storage device 140, such that the content of the memory 130 corresponding to all of the peripheral devices 150 is stored to the external storage device 140.

In step S250, most elements, such as the central processing unit 110 and the memory 130, are powered down or powered off.

Figure 3:
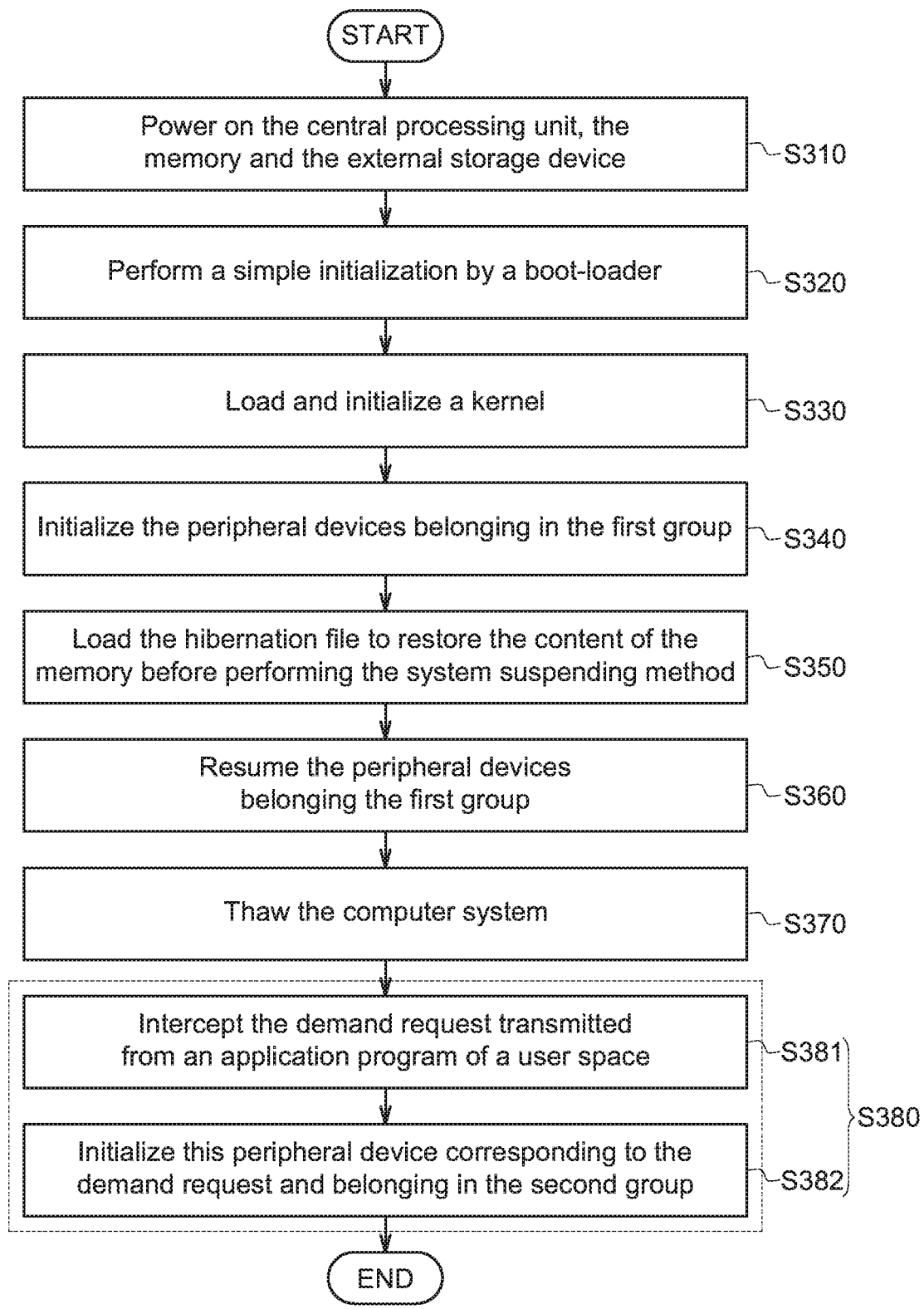
FIG. 3 shows a flowchart of the system resuming method adopting "peripheral device resuming on demand" to control the computer system to leave the suspend-to-disk status (S4 status) according to an exemplary embodiment of the disclosure.

Please refer to FIGS. 1 and 3. FIG. 3 shows an embodiment of a flowchart of the system resuming method adopting "peripheral device resuming on demand" to control the computer system 100 to leave the suspend-to-disk status (S4 status). In step S310, the central processing unit 110, the memory 130 and the external storage device 140 are powered on.

In step S320, a boot-loader performs a simple initialization.

In step S330, a kernel is loaded and initialized.

In step S340, the peripheral devices 150 belonging in the first group R1 are initialized. Each of the peripheral devices 150, belonging in the second group R2, is still kept at the suspending state or is set to be the fake resumed state. The number of the peripheral devices 150 needed to be initialized is reduced to shorten the time spending on the system resuming method.

In step S350, the hibernation file is loaded to restore the content of the memory 130 before performing the system suspending method.

In step S360, the peripheral devices 150 belonging in the first group R1 are resumed. The peripheral devices 150 belonging in the second group R2 is kept at the suspending state or set to be the fake resumed state. The number of the peripheral devices 150 needed to be resumed is reduced to shorten the time spending on the system resuming method.

In step S370, the computer system 100 is thawed. At this time, the system resuming method is completely performed.

Figure 4:
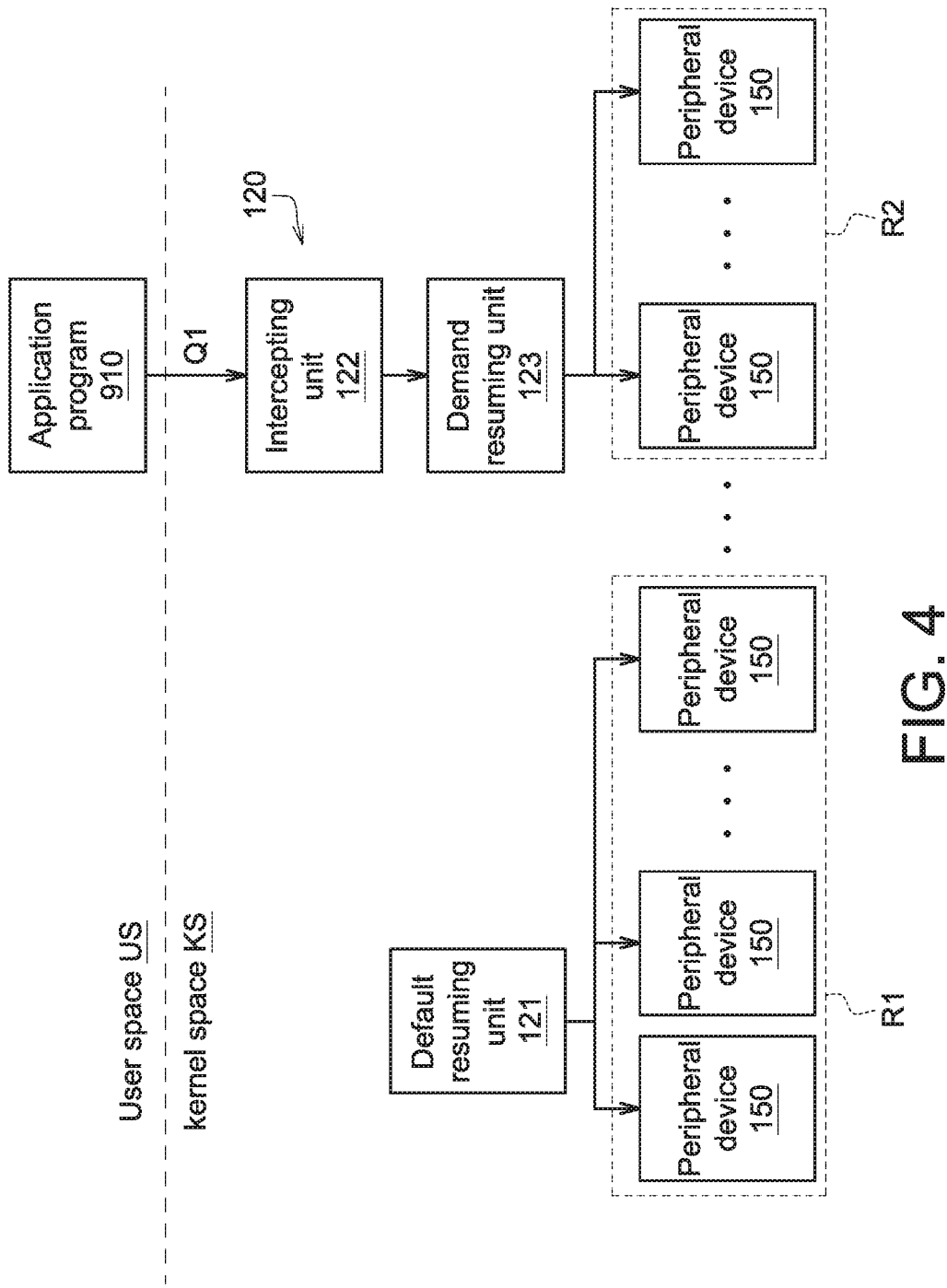
FIG. 4 shows that a power management interface performs "peripheral device resuming on demand" according to an exemplary embodiment of the disclosure

In step S380, "peripheral device resuming on demand" is performed. Please refer to FIGS. 3 and 4. FIG. 4 shows an embodiment in which the power management interface 120 performs "peripheral device resuming on demand." The power management interface 120 includes a default resuming unit 121, an intercepting unit 122 and a demand resuming unit 123. In steps S340 and S360, the default resuming unit 121 initializes and resumes the peripheral devices belonging in the first group R1. In step S381, the intercepting unit 122 intercepts the demand request Q1 transmitted from an application program 910 of a user space US. In step S382, the demand resuming unit 123 determines, corresponding to the demand request Q1, whether the peripheral device 150 is at the spending state or the fake resumed state. If the peripheral device 150, corresponding to the demand request Q1, is at the suspending state or the fake resumed state, then it is known that the peripheral device 150 belongs the second group R2. The demand resuming unit 123 initializes and resumes this peripheral device 150 corresponding to the demand request Q1 and belonging in the second group R2.

As such, in the embodiment of the system resuming method, the peripheral devices 150, belonging in the first group R1, are necessarily to be resumed. Each of the peripheral devices 150, belonging in the second group R2, is resumed according to the demand request Q1 provided from the application program 910. Therefore, the time spending on the boot can be further reduced when the fast boot adopts the aforementioned system resuming method.

Figure 5:
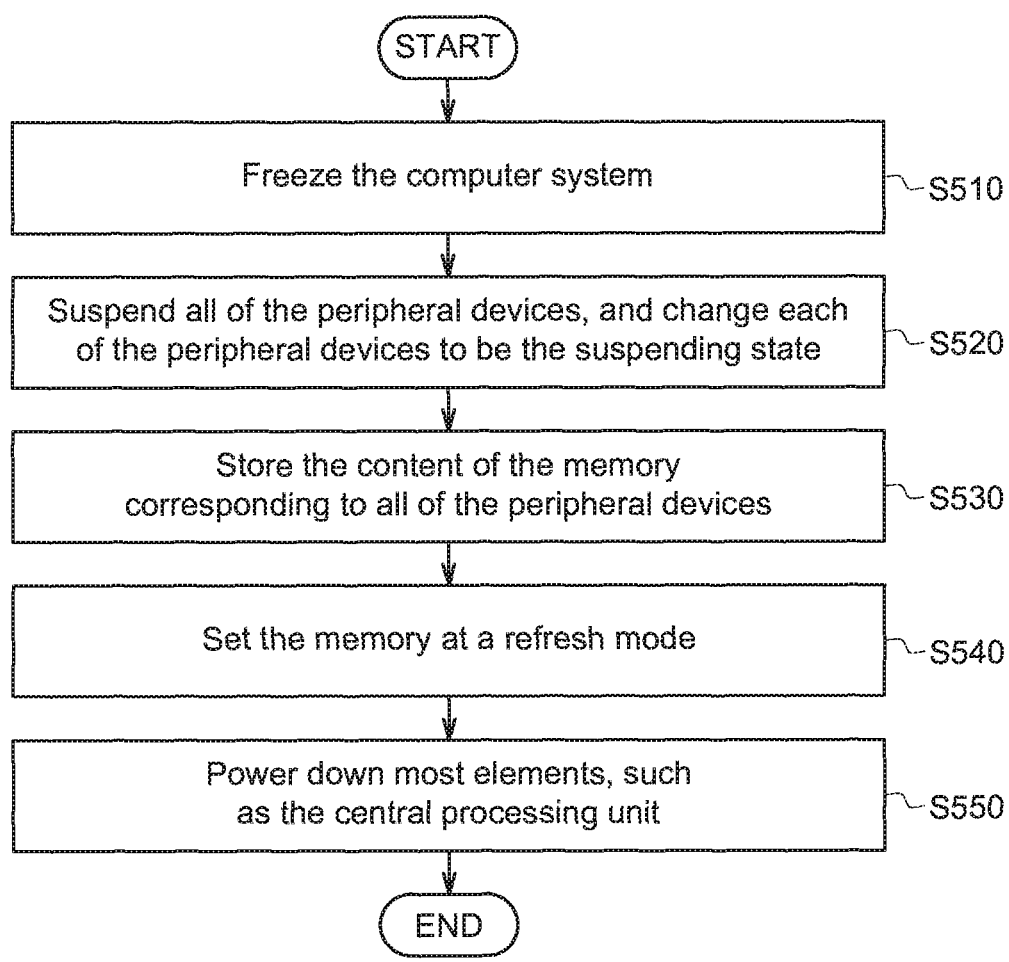
FIG. 5 shows a flowchart of a system suspending method adopting "peripheral device resuming on demand" to control the computer system to be a suspend-to-ram status (S3 status) according to an exemplary embodiment of the disclosure.

Besides the aforementioned embodiments of the suspend-to-disk technology, the fast boot adopting the suspend-to-ram technology may perform "peripheral device resuming on demand". Please referring to an embodiment shown in FIG. 5, a flowchart of a system suspending method adopting "peripheral device resuming on demand" to control the computer system 100 to be a suspend-to-ram status (S3 status) is provided. In step S510, the computer system 100 is frozen.

In step S520, all of the peripheral devices 150 are suspended, and each of the peripheral devices 150 is changed to be the suspending state. The peripheral devices 150 are classified into the first group R1 and the second group R2. In this step, the power management interface 120 may attach a predetermined tag to each of the peripheral devices 150 belonging in the first group R1. Or, the power management interface 120 may record each of the peripheral devices 150, belonging in the first group R1, in a predetermined list. Whether one peripheral device belongs in the first group R1 can be known by checking the predetermined tag or the predetermined list. The peripheral devices 150, belonging in the first group R1, are all resumed when the computer system 100 performs the system resuming method. Each of the peripheral devices 150, belonging in the second group R2, is resumed according to the demand request Q1 which is intercepted by the computer system 100 (shown in FIG. 4). In this step 520, all of the peripheral devices 150 are at the suspending state (or a powering off state); but all of the peripheral devices 150 are still kept in connection with an operating system and are not unloaded. As such, each of the peripheral devices 150 may be resumed to a former state, which may or may not be an initial state. The former state is a state before performing the system suspending method. The initial state is a state after performing the system boot method.

In step S530, the content of the memory 130 corresponding to all of the peripheral devices 150 is stored. In this step 530, the former state of each of the peripherals device 150 belonging in the first group R1 and the second group R2 is stored.

In step S540, the memory 130 is set at a refresh mode.

In step S550, most elements, such as the central processing unit 110, are powered down or powered off.

Figure 6:
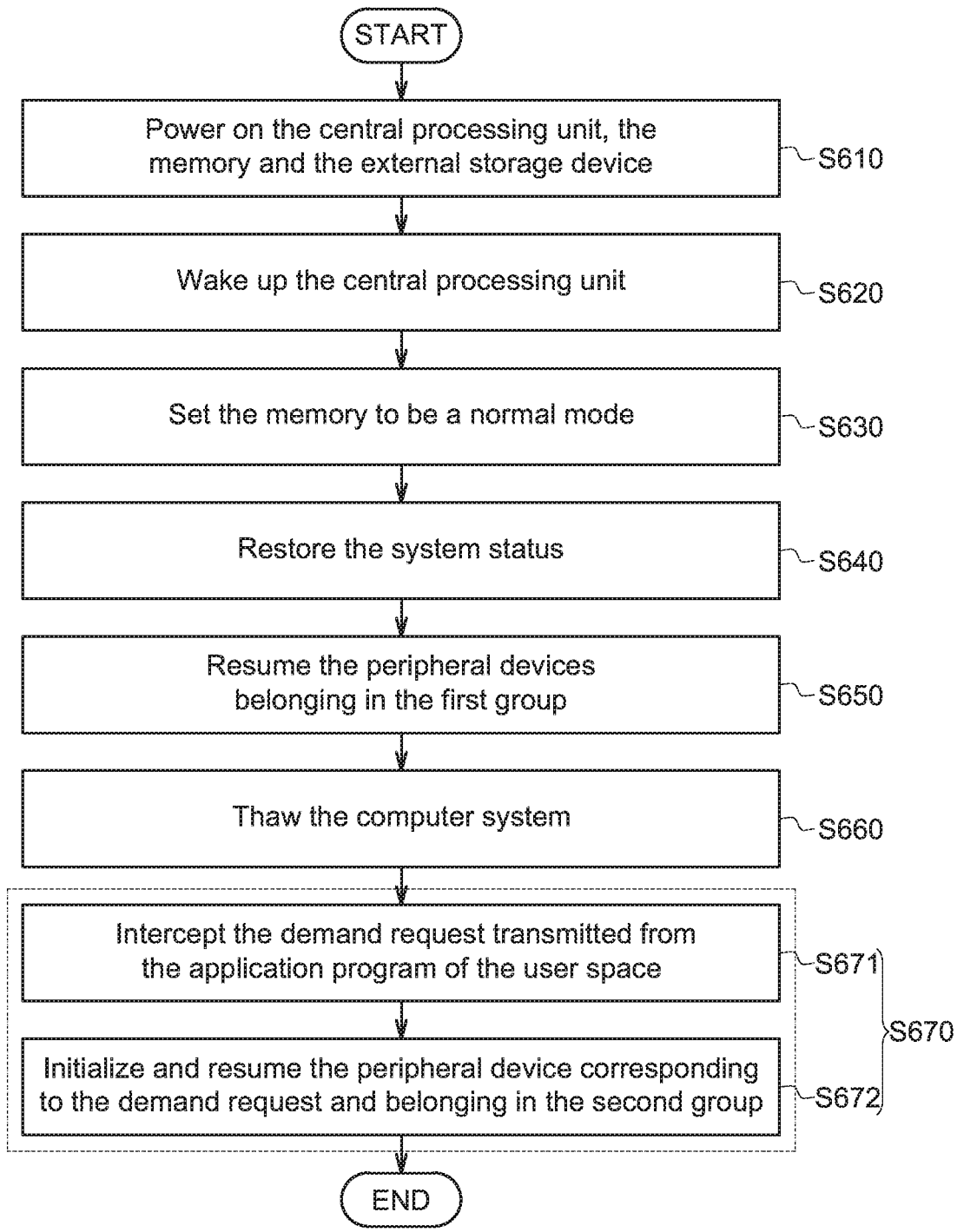
FIG. 6 shows a flowchart of the system resuming method adopting "peripheral device resuming on demand" to control the computer system to leave the suspend-to-ram status (S3 status) according to an exemplary embodiment of the disclosure.

Please refer to FIGS. 1 and 6, FIG. 6 shows an embodiment of a flowchart of the system resuming method adopting "peripheral device resuming on demand" to control the computer system 100 to leave the suspend-to-ram status (S3 status). In step S610, the central processing unit 110, the memory 130 and the external storage device 140 are powered on.

In step S620, the central processing unit 110 is waked up.

In step S630, the memory 130 is set to be a normal mode.

In step S640, the system status is restored.

In step S650, the peripheral devices 150 belonging in the first group R1 are resumed. Each of the peripheral devices 150, belonging in the second group R2, is still kept at the suspending state or is set to be the fake resumed state. The number of the peripheral devices 150 needed to be resumed is reduced to shorten the time spending on the system resuming method.

In step S660, the computer system 100 is thawed. At this time, the system resuming method is completely performed.

In step S670, "peripheral device resuming on demand" is performed. Please refer to the embodiments shown in FIGS. 4 and 6. In step S650, the default resuming unit 121 resumes the peripheral devices 150 belonging in the first group R1. In step S671, the intercepting unit 122 intercepts the demand request Q1 transmitted from the application program 910 of the user space US. In step S672, the demand resuming unit 123 initializes and resumes, corresponding to the demand request Q1, the peripheral device 150 belonging in the second group R2.

In one embodiment, one peripheral device 150 corresponding to the demand request Q1 and some other peripheral devices 150 dependent thereto may be initialized and resumed at the same time. The dependency relationship of the peripheral devices 150 may be predetermined, be created at the step of initialization in the system boot method; Or, be created in the system suspending method.

In one embodiment, the peripheral devices 150 may be classified according to a correlation with the foreground program. Or, in another embodiment, the peripheral devices 150 may be classified by a setting from the user.

In a still embodiment, the fake resumed state may be tagged to existing variable, new variable, or a table.

Figure 7:
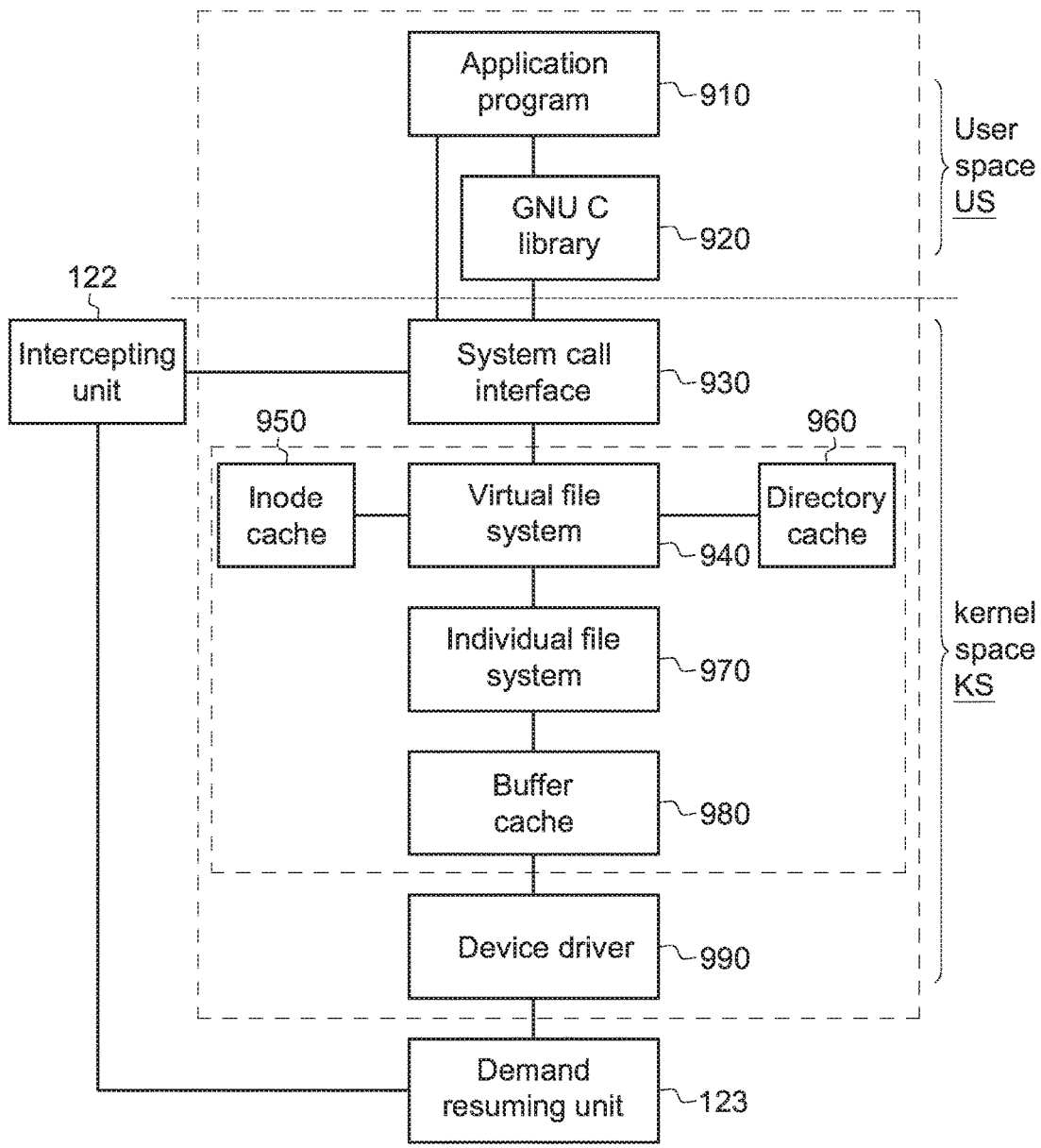
FIG. 7 shows a Linux operating system according to an exemplary embodiment of the disclosure.

Please refer to the embodiment shown in FIG. 7. FIG. 7 shows an embodiment performed in a Linux operating system according to the present disclosure. The Linux operating system includes a user space (US) and a kernel space (KS). The application program 910 and a GNU C library 920 are constructed in the user space (US). A system call interface 930, a virtual file system 940, an inode cache 950, a directory cache 960, an individual file system 970, a buffer cache 980 and a device driver 990 are constructed in the kernel space (KS). In the Linux operating system, the peripheral devices 150 are represented in forms of files. The application program 910 and the peripheral devices 150 are communicated via the system call. The intercepting unit 122 can intercept the demand request Q1, (such as open( ), read( ) write( ) or ioctl( )) in the system call interface 930. If the intercepting unit 122 intercepts the demand request Q1, then the state of the peripheral device 150 corresponding to this demand request Q1 is detected. If the peripheral device 150 is detected to be at the suspending state or the fake resumed state, the demand resuming unit 123 initializes and resumes the peripheral device 150, and then changes the peripheral device 150 to be the normal state. Afterwards, the peripheral device 150 performs some functions according to the demand request Q1.

Figure 8:
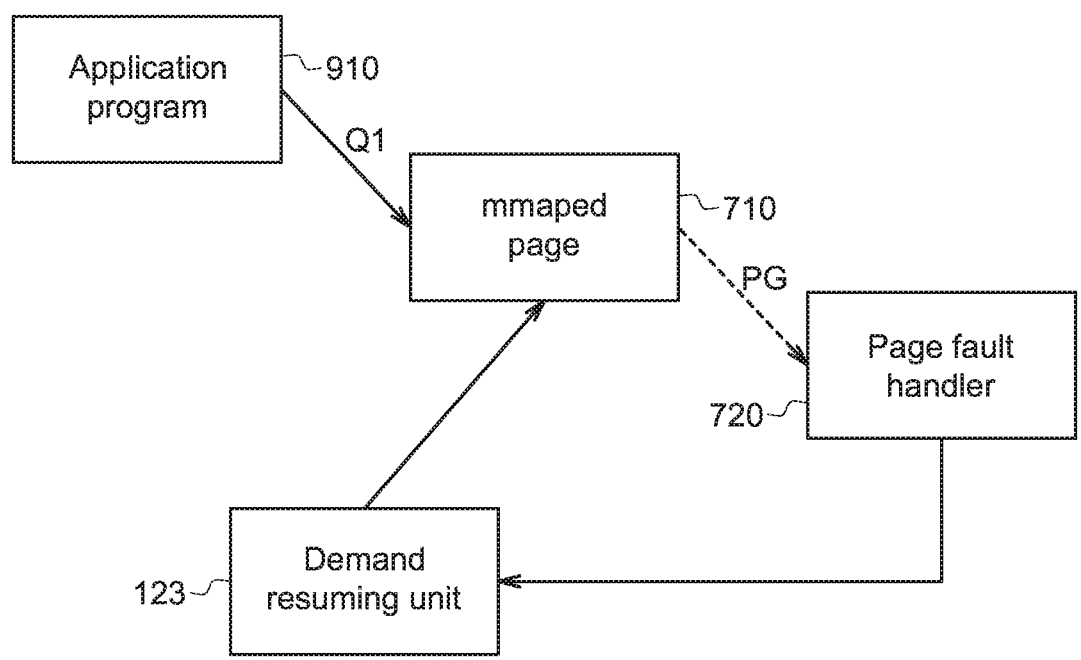
FIG. 8 shows a memory mapping (mmap) in the Linux operating system according to an exemplary embodiment of the disclosure.

Please refer to the embodiment shown in FIG. 8. FIG. 8 shows another embodiment performed in way of a memory mapping (mmap) in the Linux operating system. In the Linux operating system, the peripheral devices 150 may be performed via the mmap. When the system suspending method is performed, a mmaped page 710 of the peripheral devices 150, belonging in the second group R2, may be set as "not readable and writable". After the system suspending method is performed completely, if the application program 910 transmits the demand request Q1 for one of the peripheral devices 150 belonging in the second group G2, it will cause an interrupt of a page fault (PG). A page fault handler 720 can detect the state of the peripheral devices 150. If the peripheral device 150 is detected to be at the suspending state or the fake resumed state, the demand resuming unit 123 initializes and resumes the peripheral device 150, and then changes the peripheral device 150 to be the normal state. Afterwards, the peripheral device 150 performs some functions according to the demand request Q1.

According to the aforementioned embodiments, in "peripheral device resuming on demand", some peripheral devices which are immediately necessary are resumed. Other peripheral devices are still kept at a suspending state, or set to be a fake resumed state which pretends that the peripheral devices are resumed already, and the system resuming method is then bypassed. After completing the system resuming method, each of the peripheral devices which is at the suspending state or the fake resumed state is resumed when the demand request provided from the application program is intercepted. As such, the number of the peripheral devices needed to be resumed is reduced to shorten the time spending on the system resuming method.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system suspending method of a computer system, wherein the system suspending method is applied for controlling the computer system to be a suspend-to-ram status (S3 status) or a suspend-to-disk status (S4 status), the computer system includes a plurality of peripheral devices and a central processing unit, and the system suspending method comprises:
   freezing the computer system;
   suspending the peripheral devices, wherein the peripheral devices are classified into a first group and a second group, the peripheral devices, belonging in the first group, are then resumed when the computer system performs a system resuming method and each of the peripheral devices, belonging in the second group, is then resumed according to a demand request; and
   powering down the central processing unit.

2. The system suspending method of the computer system according to claim 1, wherein the peripheral devices are kept in connection with an operating system.

3. The system suspending method of the computer system according to claim 1, wherein the system suspending method is applied for controlling the computer system to be the suspend-to-disk status (S4 status), the computer system further includes a memory and an external storage device, and the system suspending method further comprises:
   storing a content of the memory corresponding to the peripheral devices into the external storage device.

4. The system suspending method of the computer system according to claim 1, wherein each of the peripheral devices belonging in the first group is related to at least one foreground program.

5. The system suspending method of the computer system according to claim 1, wherein each of the peripheral devices belonging in the first group is attached a predetermined tag.

6. The system suspending method of the computer system according to claim 1, wherein each of the peripheral devices belonging in the first group is recorded in a predetermined list.

7. A system resuming method of a computer system, wherein the system resuming method of the computer system is applied for controlling the computer system to be a normal status (S0 status) from a suspend-to-ram status (S3 status) or a suspend-to-disk status (S4 status), the computer system includes a plurality of peripheral devices and a central processing unit, the peripheral devices are classified into a first group and a second group, and the system resuming method comprises:
   powering on the central processing unit;
   resuming the peripheral devices belonging in the first group; and
   thawing the computer system;
   wherein each of the peripheral devices belonging in the second group is set to be a fake resumed state.

8. The system resuming method of the computer system according to claim 7, wherein each of the peripheral devices belonging in the first group is related to at least one foreground program.

9. The system resuming method of the computer system according to claim 7, wherein each of the peripheral devices, belonging in the first group, is attached a predetermined tag.

10. The system resuming method of the computer system according to claim 7, wherein each of the peripheral devices, belonging in the first group, is recorded in a predetermined list.

11. A computer system, comprising:
    a plurality of peripheral devices;
    a power management interface; and
    a central processing unit applied to control the peripheral devices and the power management interface;
    wherein the power management interface is applied to perform a system suspending method for controlling the computer system to be a suspend-to-ram status (S3 status) or a suspend-to-disk status (S4 status);
    wherein in the system suspending method, the power management interface freezes the computer system, suspends the peripheral devices, and powers down the central processing unit;
    wherein the power management interface classifies the peripheral devices into a first group and a second group; and
    wherein the peripheral devices, belonging in the first group, are resumed when the computer system performs a system resuming method and each of the peripheral devices, belonging in the second group, is resumed according to a demand request.

12. The computer system according to claim 11, wherein in the system suspending method, the power management interface keeps the peripheral devices in connection with an operating system.

13. The computer system according to claim 11, wherein the system suspending method is applied for controlling the computer system to be the suspend-to-disk status (S4 status), the computer system further includes a memory and an external storage device, and in the system suspending method, the power management interface further stores a content of the memory corresponding to the peripheral devices into the external storage device.

14. The computer system according to claim 11, wherein each of the peripheral devices, belonging in the first group, is related to at least one foreground program.

15. The computer system according to claim 11, wherein the system resuming method is applied for controlling the computer system to be a normal status (S0 status) from the suspend-to-ram status (S3 status) or the suspend-to-disk status (S4 status), and in the system resuming method, the power management interface powers on the central processing unit, resumes the peripheral devices belonging in the first group, and thaws the computer system.

16. The computer system according to claim 15, wherein the power management interface sets each of the peripheral devices, belonging in the second group, to be a fake resumed state.

17. The computer system according to claim 15, wherein in the system resuming method, the power management interface resumes each of the peripheral devices, belonging in the second group, according to a demand request.

18. The computer system according to claim 15, wherein each of the peripheral devices, belonging in the first group, is attached a predetermined tag.

19. The computer system according to claim 15, wherein each of the peripheral devices, belonging in the first group, is recorded in a predetermined list.

20. A system resuming method of a computer system, wherein the system resuming method of the computer system is applied for controlling the computer system to be a normal status (SO status) from a suspend-to-ram status (S3 status) or a suspend-to-disk status (S4 status), the computer system includes a plurality of peripheral devices and a central processing unit, the peripheral devices are classified into a first group and a second group, and the system resuming method comprises:

powering on the central processing unit;

resuming the peripheral devices belonging in the first group;

thawing the computer system;

intercepting a demand request; and resuming at least one of the peripheral devices, belonging in the second group, according to the demand request.

* * * * *